US012214474B2

(12) United States Patent
Hasbrouck

(10) Patent No.: US 12,214,474 B2
(45) Date of Patent: Feb. 4, 2025

(54) OIL FILTER GRIPPING TOOL

(71) Applicant: Hunter Hasbrouck, Puyallup, WA (US)

(72) Inventor: Hunter Hasbrouck, Puyallup, WA (US)

( * ) Notice: Subject to any disclaimer, the term of this patent is extended or adjusted under 35 U.S.C. 154(b) by 318 days.

(21) Appl. No.: 17/733,808

(22) Filed: Apr. 29, 2022

(65) Prior Publication Data

US 2023/0347484 A1 Nov. 2, 2023

(51) Int. Cl.
*B25B 27/00* (2006.01)

(52) U.S. Cl.
CPC ................................ *B25B 27/0042* (2013.01)

(58) Field of Classification Search
CPC ............ B25B 27/0042; B25B 27/0007; B25B 27/0035; B25B 23/0007; B25B 23/0042; B25B 13/481; B25B 13/06
See application file for complete search history.

(56) References Cited

U.S. PATENT DOCUMENTS 5,129,291 A * 7/1992 Poniatowski ....... B25B 27/0042 81/446
5,386,748 A * 2/1995 Kilgore ............... B25B 27/0042 81/180.1
9,925,650 B2 * 3/2018 Markiewicz ........ B25B 27/0042
11,311,985 B2 * 4/2022 Li .......................... B25B 13/462
2020/0240397 A1 * 7/2020 Hsieh ......................... F03G 3/08
2020/0338704 A1 * 10/2020 Merrill ................ B25B 27/0042
2022/0048169 A1 * 2/2022 Sands ................. B25B 13/5008
2023/0048818 A1 * 2/2023 Rönblom ................ B25B 21/02

* cited by examiner

*Primary Examiner* — David B. Thomas
(74) *Attorney, Agent, or Firm* — Larsen IP PLLC; James Larsen

(57) ABSTRACT

An engine oil filter gripping tool is disclosed. The device is comprised of a cylindrical cap body and an interchangeable drive hub having a ratchet aperture. An object of the invention is to provide a device that will allow a user to remove conventional spin-on and cartridge oil filters using multiple-sized ratchet drivers. The interchangeable drive hub comes in various aperture ratchet sizes such as ⅜-inch and ½-inch drive. The user installs the interchangeable drive hub depending on the size ratchet they wish to use.

11 Claims, 4 Drawing Sheets

OIL FILTER GRIPPING TOOL

CROSS-REFERENCE TO RELATED APPLICATIONS

This application claims the benefit of U.S. Provisional Patent Application No. 63/182,568 filed on Apr. 30, 2021.

FIELD OF THE INVENTION

The present invention generally relates to tools. More specifically, it relates to an engine oil filter gripping device that can accept multiple-size ratchet drives.

BACKGROUND

The first oil filters for automobiles appeared around the 1920s. Ernest Sweetland and George Greenhalgh invented the first oil filter comprised of a fabric filter mounted inside a steel canister. The cartridge had to be replaced from time to time. The first spin-on oil filter was developed many years later in 1954. It quickly became popular because it wasn't as messy as the cartridge-style filter and it was much quicker to replace. Spin-off oil filters are still in use on a majority of automobiles today. These filters are often installed or removed using hand held tools including: chain wrenches, strap wrenches, and cap wrenches. Some of these cap tools include ⅜-inch, ratchet drive apertures. However, what is needed is an oil filter gripping tool that can be used with multiple-sized ratchet drives. U.S. Pat. No. D512,886S granted to Christensen disclosed oil filter removal nut that does not specify if the nut is removable or how a ratchet attaches to the device. U.S. Pat. No. D361,926 granted to Strickland disclosed a tool for removing oil filters but does not include a drive hub. European Patent No. EP1990136A1 granted to Greenberg disclosed an oil filter removal tool but does not include a drive hub. U.S. Pat. Nos. D784,099S and US2006/0053983A1 granted to Groetsch and Mitchel disclosed oil filter cannister tools; however, they are only one-piece devices and do not include a separate drive hub.

SUMMARY OF THE INVENTION

The device herein disclosed and described provides a solution to the shortcomings in the prior art through the disclosure of a system and method for gripping oil filters. The device comes with a cap body having a plurality of angular portions that will fit most conventional, spin-on and cartridge style oil filter canisters.

Another object of the invention is to allow an oil filter to be removed using ratchet drivers of different sizes. When using a standard, square-shaped, ⅜-inch drive ratchet, the user inserts the ⅜-inch drive hub into the cap body and inserts the ratchet into the drive hub. When using a ½-inch drive ratchet, the user inserts the ½-inch drive hub into the cap body and then inserts the ratchet into the drive hub.

Another object of the invention is to allow the drive hub to remain affixed to the cap body during use. The drive hub includes a retaining ring that holds the hub into the cap body during a filter install or removal operation.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present.

By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE FIGURES

The accompanying drawings, which are incorporated herein and form a part of the specification, illustrate some, but not the only or exclusive, examples of embodiments and/or features.

Figure 1:
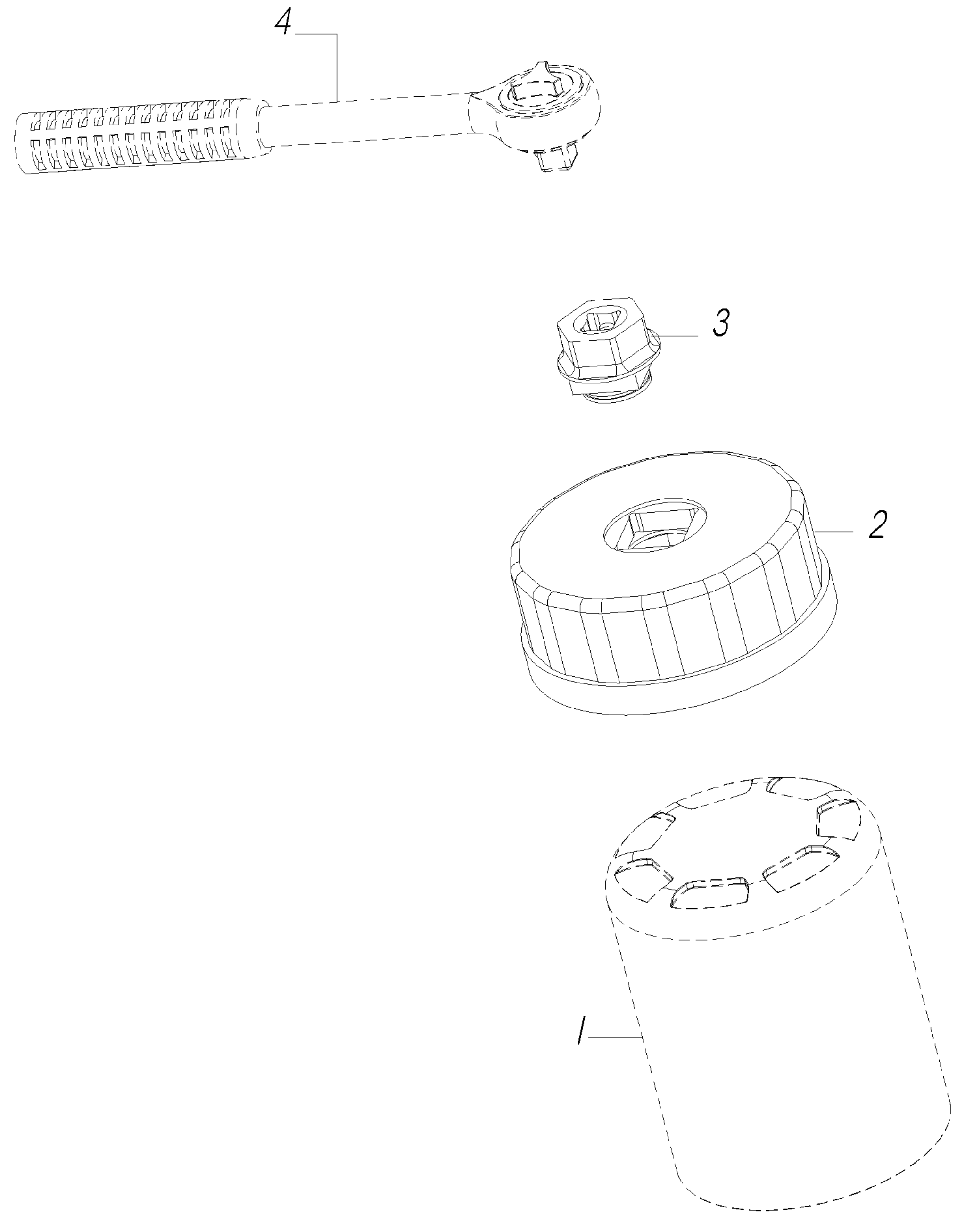
FIG. 1 shows an exploded view of the device.

Other aspects of the present invention shall be more readily understood when considered in conjunction with the accompanying drawings, and the following detailed description, neither of which should be considered limiting.

DETAILED DESCRIPTION OF FIGURES

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation. Conventional components of the invention are elements that are well-known in the prior art and will not be discussed in detail for this disclosure.

Figure 2:
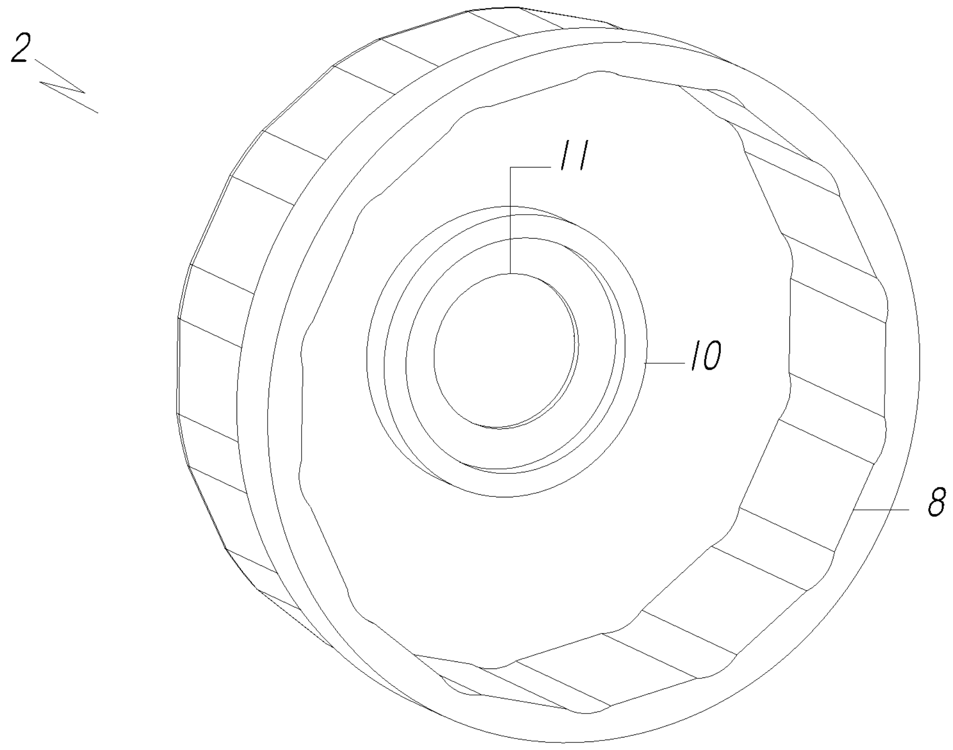
FIG. 2 shows rear view of the cylindrical cap body.

FIG. 1 shows an exploded perspective view of a preferred embodiment of the device comprised of cylindrical cap body 2 and interchangeable drive hub 3 being operated on a conventional oil filter 1 (not part of the disclosure) using conventional ratchet 4 (also not part of the disclosure). FIG. 2 showing one side of cylindrical cap body 2 having circular aperture 11 with retaining ring protection lip 10 configured proximally. An edge of cylindrical cap body 2 having a raised portion with fluted formations to grip a standard oil filter herein referred to as filter flutes 8.

Figure 3:
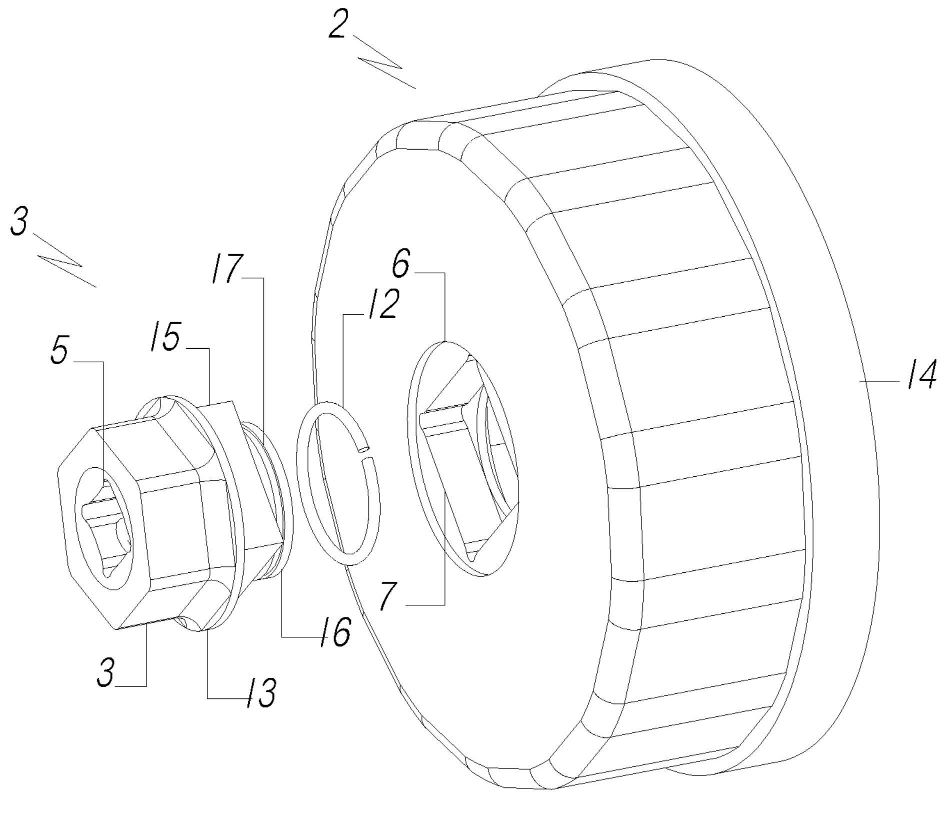
FIG. 3 shows a front view of the cylindrical cap body and interchangeable drive hub.

FIG. 3 showing another side said cylindrical cap body 2 having a circular shaped depression 6 with a square-shaped drive aperture 7 disposed proximally to engage interchangeable drive hub 3. Interchangeable drive hub 3 has a mating square connection 15 also having a cylindrical protrusion 16 with a grooved recess 17 to receive retaining ring 12 therein. Said interchangeable drive hub 3 also having a proximal positioning flange 13 that positions it on cylindrical cap body 2. Another end of interchangeable drive hub 3 having two embodiments of different sized, square-shaped apertures (herein referred to as ratchet drive hole 5) configured to receive either a ⅜-inch or ½-inch ratchet drive as well as detents on the inner walls to engage a spring-loaded ball detent on a ratchet drive. The drive hub 3 and cap body 2 are made of a rigid material including but not limited to: aluminum, steel, titanium and the like and being manufactured by means of a plurality of processes including but not limited to: casting, 3D sinter printing, die stamp forging, machining, and the like.

Figure 4:
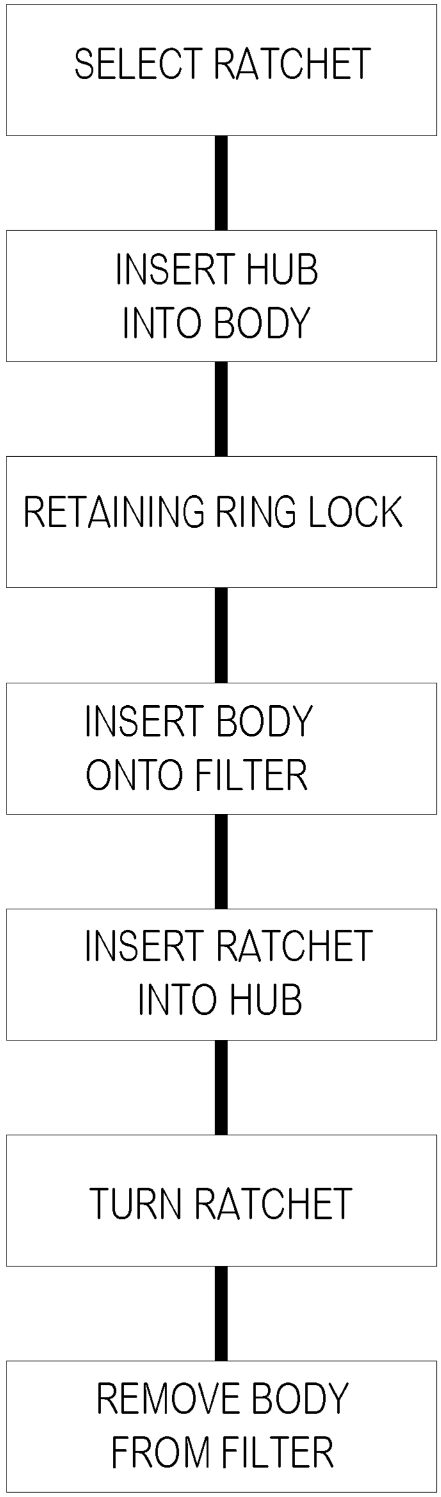
FIG. 4 shows a representative view of the device's method.

FIG. 4 showing a representative view of the device's method comprised of but not limited to the following steps: selecting either a ⅜-inch or ½-inch ratchet; the user inserting the proper sized interchangeable drive hub embodiment into the cylindrical cap body; locking the cylindrical cap body to the interchangeable drive hub with retaining ring, inserting the cylindrical cap body onto an oil filter; installing the ratchet into the interchangeable drive hub; turning the ratchet and removing said filter from cylindrical cap body.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the scope of the invention.

What is claimed is:

1. A device for gripping oil filters comprising:

a cylindrical cap body having an aperture disposed at a base thereof;

an interchangeable drive hub selected from a plurality of interchangeable drive hubs, each interchangeable drive hub including, in a first end, a drive hole configured to receive a drive square of a driving tool, the interchangeable drive hub configured to apply rotational force to the cylindrical cap body; and a compliant retaining ring disposed, when in an engaged state, about a peripheral extent of the interchangeable drive hub proximate a second end of the interchangeable drive hub, the retaining ring having an outer perimeter sized greater than a perimeter of the aperture of the cylindrical cap body and an inner perimeter sized smaller than the perimeter of the aperture, the retaining ring constituting a securing feature to releasably hold the interchangeable drive hub in the aperture.

2. The device for gripping oil filters of claim 1, wherein the aperture of the cylindrical cap body includes a circular aperture portion.

3. The device for gripping oil filters of claim 1, wherein the cylindrical cap body includes a retaining ring protection lip disposed around the aperture and protruding into the cylindrical cap body from the base of the cylindrical cap body around.

4. The device for gripping oil filters of claim 1, wherein the cylindrical cap body includes fluted formations at least at an interior perimeter of the cylindrical cap body, the fluted formations providing a plurality of surface faces configured to engage corresponding surface faces of an oil filter.

5. The device for gripping oil filters of claim 1, wherein the interchangeable drive hub includes a positioning flange disposed between the first end and the second end; and the cylindrical cap body includes a circular shaped depression disposed at a rear portion of the cylindrical cap body, the circular shaped depression sized and formed to receive and position the positioning flange.

6. The device for gripping oil filters of claim 1, wherein the interchangeable drive hub includes a mating drive connection, and the aperture of the cylindrical cap body includes a drive aperture configured to receive the mating drive connection.

7. The device for gripping oil filters of claim 6, wherein the drive connection and the drive aperture are each square-shaped.

8. The device for gripping oil filters of claim 1, wherein the plurality of interchangeable drive hubs includes at least one interchangeable drive hub for which the drive hole is of a different size than the drive hole of another interchangeable drive hub of the plurality of interchangeable drive hubs for receiving a differently-sized drive square of a respective driving tool.

9. The device for gripping oil filters of claim 1, wherein the interchangeable drive hub includes a cylindrical protrusion, the cylindrical protrusion having a grooved recess about an exterior of the cylindrical protrusion, the grooved recess sized to receive the retaining ring.

10. The device for gripping oil filters of claim 1, wherein the drive hole of each interchangeable drive hub includes at least one detent configured to receive a detent ball of the drive square.

11. A method for turning an oil filter with a device for gripping oil filters according to claim 1, the method comprising:

providing the device for gripping oil filters of claim 1;

selecting as the drive tool a ratchet having a drive square of a first dimension;

selecting from the plurality of interchangeable drive hubs an interchangeable drive hub of which the drive hole is sized to correspond with the first dimension;

inserting the interchangeable drive hub into the aperture of the cylindrical cap body; and affixing the interchangeable drive hub to the cylindrical cap body with the retaining ring;

inserting the cylindrical cap body onto an oil filter;

locking retaining ring into interchangeable drive hub; and installing the drive square of the ratchet into the drive hole of the selected interchangeable drive hub.

* * * * *